June 6, 1950     C. CHRISTENSON     2,510,462
METHOD AND APPARATUS FOR MAKING SAWS
Filed May 12, 1948
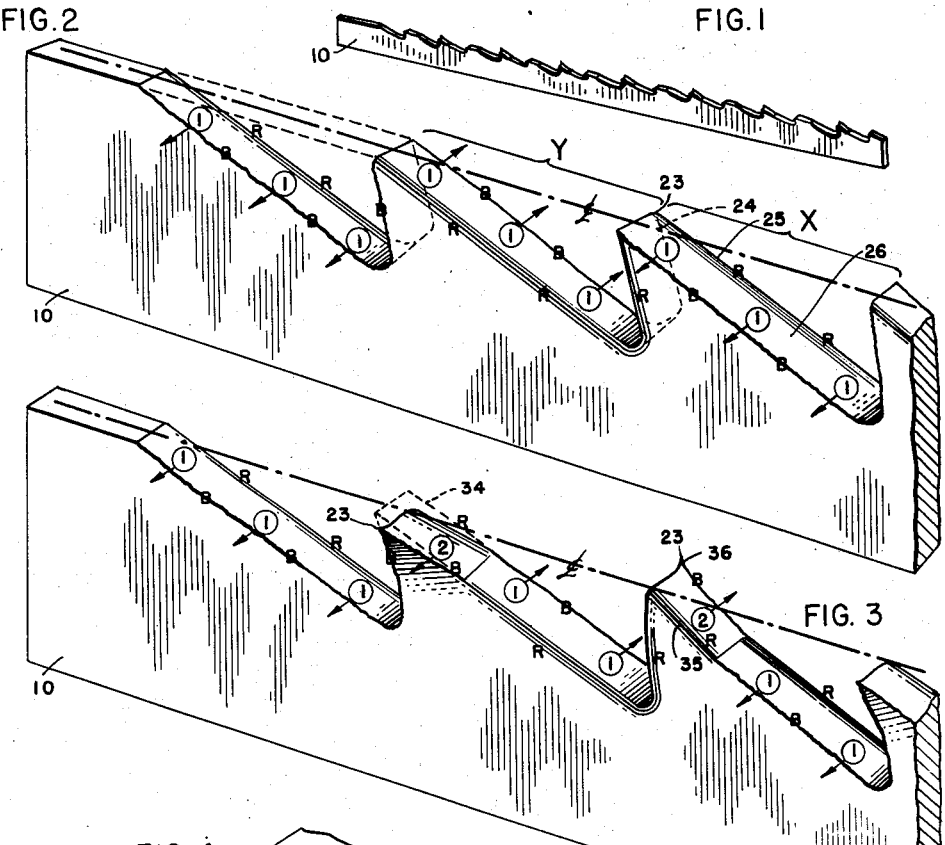
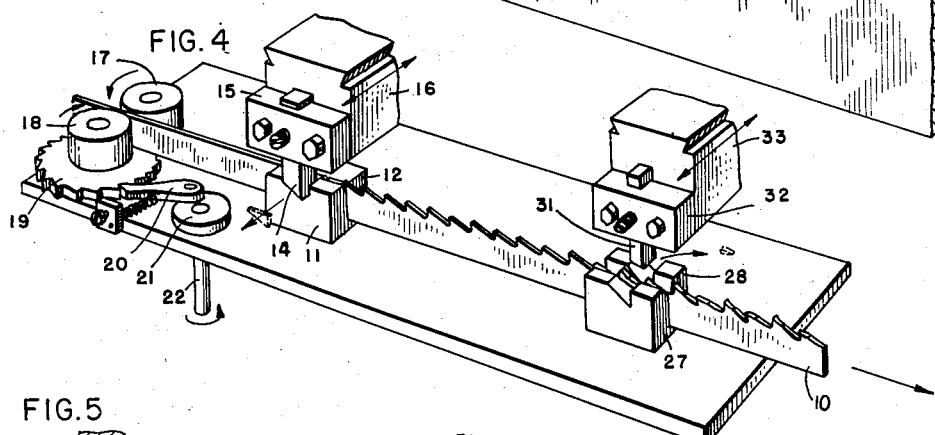
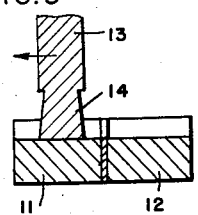 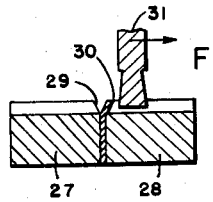
INVENTOR.
CHARLES CHRISTENSON
BY Glenn S. Noble
ATT'Y Patented June 6, 1950

2,510,462

UNITED STATES PATENT OFFICE 2,510,462

METHOD AND APPARATUS FOR MAKING SAWS

Charles Christenson, Chicago, Ill.

Application May 12, 1948, Serial No. 26,629

5 Claims. (Cl. 76—79)

This invention relates to the manufacture of saws of various kinds, but is particularly directed to making band saws which are formed of long strips of suitable steel. When a piece of metal is punched out of a strip of steel by means of a punch and die as in the punching out portions of metal to form saw teeth, the metal around the periphery of the entering side of the punch is rounded or crushed while the metal around the leaving side is burred and sharpened, and the metal is also hardened by the cold forging action of the punch and die.

In accordance with the present invention, I take advantage of this operation in order to provide teeth with exceptionally sharp cutting points or edges. In my improved method, the teeth may be formed by punching operation without being set, and thereafter the teeth are further sharpened and set by another punching operation.

Among the objects of this invention are to provide an improved apparatus for first forming the teeth and then sharpening and setting the same; to provide means for sharpening and simultaneously setting the teeth of a saw; to provide an improved apparatus and method for making saws which will completely finish the saw by punching operations and will produce sharpened teeth without the necessity of any further sharpening operation; to provide an improved method of making the saws; and to provide such other advantages and improvements as will be set forth more fully hereinafter.

In the accompanying drawings illustrating this invention,

Fig. 1 is a perspective view of a saw made in accordance with the present method;

Fig. 2 is an enlarged somewhat diagrammatic view showing the saw with the teeth formed, but not set;

Fig. 3 is a view similar to Fig. 2 showing the completed saw with the teeth sharpened and set;

Fig. 4 is a perspective view of the apparatus also shown diagrammatically and with parts omitted for convenience in illustration;

Fig. 5 is an enlarged sectional detail of the dies and punch which cooperate therewith for cutting the teeth; and Fig. 6 is a view similar to Fig. 5 showing the dies and punch coacting therewith for sharpening and setting the teeth.

As seen in these drawings, the saw blade 10 is made of a strip of steel or other metal suitable for the manufacture of saws. This strip is fed through a pair of dies 11 and 12 forming a part of the apparatus as shown in Figs. 4 and 5. A punch 13 coacts with these dies to cut out substantially triangular pieces of metal from the edge of the band to form the teeth. The passes through the dies may be shaped so that the teeth will be undercut or made in any desired conformation, the lower or cutting portion 14 of the punch being shaped accordingly to coact with these dies. The punch is supported in a tool holder 15 which is actuated by a ram 16 forming a part of the machine tool and actuated in any well known manner to reciprocate the punch. The inner or cutting faces of the dies are substantially parallel so that the teeth are supported as they are being cut and are not set. The strip is fed by a suitable feeding means such as the feed rollers 17 and 18 which are rotated intermittently as by means of a ratchet wheel 19 which is actuated by a pawl 20 driven by a crank 21 on a shaft 22 which in turn is driven by any suitable mechanism.

As shown in Fig. 2, it may be assumed that the first cut as indicated at X is made with the punch moving in the direction of the arrows 1, 1. This causes the edge of the metal around the entire periphery of the cut where the punch entered to be rounded as indicated at R. The corresponding edge on the exit side of the punch is burred or roughened as shown at B and makes an exceedingly sharp knife-like cutting edge. The second cut as indicated at Y is made with a punch moving in the opposite direction as also indicated by the arrows which cause the rounded edge to appear on the side opposite from the first rounded edge and the burred or sharpened edge on the side opposite from the first burred or sharpened edge as also indicated at B. It will thus be seen that the extreme point 23 of the first tooth which is to become the cutting point is formed by the intersection of a sharpened edge 24 on the face of the tooth and a rounded edge 25, on the back 26. This also is true of the subsequent teeth which are formed in making the saw. As the teeth are being formed by the die passing through, first in one direction and then the other, these sharpened and rounded intersections occur first on one side of the saw and then on the other.

The teeth are next finished and sharpened as well as set by another punch and die operation which is preferably done in synchronism with the first operation by means of the apparatus shown in Fig. 4. The sharpening and setting dies 27 and 28 are beveled or relieved on the cutting faces as indicated at 29 and 30 to permit the teeth to be set when the final cuts are made by the punch 31 which coacts with these dies. This punch may be supported and actuated in any well known manner, being shown as mounted in a tool or punch holder 32 actuated by a ram 33 which is supported and reciprocated in the machine tool in any well known manner. As the saw is fed forwardly, the teeth are presented to the dies 27 and 28 and the reciprocating punch 31 is shaped so that small triangular pieces as indicated at 34 are sheared from the edges of the teeth as best shown in Fig. 3. During this movement, the punch 31 moves in the opposite direction from the movement of the punch which formed the back of the tooth which is being sharpened.

As shown in Fig. 3, the punch 31 has moved in the direction of the arrow 2 opposite to that of the arrow 1. This causes the edge 35 of the corresponding portion of the back of the tooth to be rounded as indicated, and the edge 36 to be burred and sharpened so that it intersects a correspondingly burred and sharpened edge on the face of the tooth. This forming of the cutting points 23 by intersecting sharpened edges makes these points exceedingly sharp and provide knife-like and almost needle-like cutting points, such points being the important cutting elements of the saw. The punch or cutting die 31 when moving across the end of the tooth as indicated in Fig. 3 also sets the tooth. The saw is then moved forwardly the distance of a tooth to present the next tooth between the dies 27 and 28, and the punch 31 is then reciprocated in the opposite direction so that the next tooth is sharpened and simultaneously set during such movement. The shearing of the tip of this tooth causes the rounded edge at the end of the tooth to be sheared off and the edge is burred or sharpened adjacent to the tip of the tooth as clearly indicated. These operations are repeated until all of the teeth have been sharpened and set.

In operation, the blank for the saw blade 10 is placed in position in the machine as shown in Fig. 4 with its portion which is to receive the first cut, between the dies 11 and 12. The punch or cutting die 14 is then actuated to make the first cut and the blank is then fed intermittently by the feeding device so that the punch and die mechanism will cut the subsequent teeth, the punch being reciprocated across the path of the stock or blade as above described. The blade 10 then passes between the dies 27 and 28, and the feed is such as to present the teeth in proper position to be acted upon by the punch 31 which reciprocates across the path of the saw to cut and set the teeth alternately.

It will also be noted that the teeth may be formed in the blank by suitable forming tools and the teeth subsequently sharpened by means of the sharpening and setting devices above described.

My improved apparatus provides means for making saws rapidly and also provides means for sharpening and setting the teeth whereby they will have keen cutting points or portions without the necessity of further operations.

While I have shown one form of tooth, it will be apparent that the teeth may be made of any desired shape and sharpened in accordance with my improved method. Furthermore, any steel or metal suitable for making saws may be utilized, but I prefer to use high carbon steel which will be hardened and compressed by the cold forging incident to the punching and setting operations such cold forging also serving to improve the teeth whereby they will be more readily hardened by subsequent hardening operations. It will also be noted that the principal parts of the saw which have any value in cutting are the cutting apexes or points on the outer sides of the teeth after they have been set. Saws of this kind are often used for only a short time and then discarded which makes it particularly desirable to manufacture the same at low cost.

From this description, it will be seen that I provide means whereby saws of various kinds may be made with accurately formed teeth which will be sharper than those made by previous methods, and therefore I do not wish to be limited to the particular apparatus or method described except as set forth in the following claims.

I claim:

1. The method of making a saw which consists in forming teeth in a strip of suitable stock by means of dies and a reciprocating punch which coacts with the dies and cuts from opposite sides of the stock, and then sharpening and setting the teeth by means of a punch and dies to shear off small portions of the ends of the teeth, the punch engaging with the respective teeth on the sides having the edges burred by the first named punching operations.

2. The process of making saws which consists in subjecting a strip of stock to the action of a teeth forming punch and coacting dies whereby the edges of the portions of the teeth are sharpened and compressed on the exit side of the punch where they engage with the die and are rounded on the entrance side, and then sharpening and setting the teeth by means of a punch and dies which cut off portions of the teeth having such rounded edges adjacent to the cutting edge to provide cutting points formed by the intersection of two compressed and sharpened edges, and simultaneously bending a portion of the tooth outwardly to set the same.

3. Apparatus for making saws consisting of two dies between which the stock is passed, a reciprocating punch coacting with said dies to form teeth, means for actuating said punch, means for feeding the stock intermittently, a second pair of dies for receiving the stock with the teeth formed therein, said dies being beveled on their operating faces to permit the teeth to be set, a reciprocating punch coacting with the last named dies and adapted to to cut off small portions of the ends of the teeth and set the teeth, and means for actuating the last named punch, the arrangement being such that the cutting points of the teeth are formed by intersecting edges which have been burred and sharpened by the dies and punches.

4. In an apparatus for sharpening and setting previously formed teeth in saws, the combination of a support, a pair of dies mounted on said support between which the saw blade is passed to present the teeth to the dies, a cutting die coacting with the first named dies, means for supporting and actuating the cutting die to cause it to reciprocate past the first named dies and cut off the tips of the teeth and simultaneously setting the same, and means for feeding the saw through said dies.

5. The method of making saws from suitable stock which consist in forming teeth in the stock by means of a forming punch coacting with suitable dies, the punch moving first in one direction across the stock and then in the opposite direction across the stock and at each movement forming the face of one tooth and the back of an adjacent tooth, and finishing the teeth by means of a finishing punch and dies, the finishing punch removing a portion of the tip of the tooth during its movement in the same direction as the punch forming the face of the tooth, the back of the same tooth having been formed by the forming punch moving in the opposite direction, thereby providing sharpened edges which meet at the point of the tooth.

CHARLES CHRISTENSON.

REFERENCES CITED

The following references are of record in the file of this patent:

UNITED STATES PATENTS

| Number | Name | Date |
|---|---|---|
| 1,318,659 | Garrison | Oct. 14, 1919 |
| 1,631,657 | Swett | June 7, 1927 |
| 1,968,352 | Poeggel | July 31, 1934 |
| 2,030,225 | Poeggel | Feb. 11, 1936 |